(12) United States Patent  
Washburn

(10) Patent No.: US 6,796,547 B1  
(45) Date of Patent: Sep. 28, 2004

(54) COLLAPSIBLE DUCT

(75) Inventor: Robert B. Washburn, Amherst, OH (US)

(73) Assignee: Arnco Corporation, Elyria, OH (US)

( * ) Notice: Subject to any disclaimer, the term of this patent is extended or adjusted under 35 U.S.C. 154(b) by 253 days.

(21) Appl. No.: 10/079,295

(22) Filed: Feb. 20, 2002

(51) Int. Cl.$^7$ .............................................. B65H 59/00
(52) U.S. Cl. ............................................. 254/134.3 FT
(58) Field of Search ............................. 254/134.3 FT, 254/134.3 R, 134.4

(56) References Cited

U.S. PATENT DOCUMENTS

| | | | |
|---|---|---|---|
| 3,173,196 A | 3/1965 | Grimm | 29/157.3 |
| 3,201,861 A | 8/1965 | Fromson et al. | 29/455 |
| 3,569,875 A | 3/1971 | Paine | 333/96 |
| 4,385,021 A | 5/1983 | Neeley | 264/173 |
| 4,565,351 A | 1/1986 | Conti et al. | 254/134.3 FT |
| 4,588,459 A | 5/1986 | Zwilling | 156/85 |
| 4,709,730 A | 12/1987 | Zwilling | 138/111 |
| 4,745,238 A | 5/1988 | Kotthaus et al. | 174/101.5 |
| 4,804,020 A | 2/1989 | Bartholomew | 138/111 |
| 5,027,864 A | 7/1991 | Conti et al. | 138/177 |
| 5,087,153 A | 2/1992 | Washburn | 405/154 |
| 5,172,765 A | 12/1992 | Sas-Jaworsky et al. | 166/384 |
| 5,271,433 A | 12/1993 | Schwert et al. | 138/98 |
| 5,335,872 A | 8/1994 | Clubbs | 242/610.6 |
| 5,349,989 A | 9/1994 | Legallais | 138/111 |
| 5,395,472 A | 3/1995 | Mandich | 156/287 |
| 5,678,609 A | 10/1997 | Washburn | 138/107 |
| 5,810,053 A | 9/1998 | Mandich | 138/98 |
| 5,813,658 A | 9/1998 | Kaminski et al. | 254/134.4 |
| 5,922,995 A | 7/1999 | Allen | 174/95 |

Primary Examiner—Robert C. Watson  
(74) Attorney, Agent, or Firm—Pearne & Gordon LLP

(57) ABSTRACT

A duct for containing a cable and method for mounting the cable therein include providing the duct with a collapsible or flexible wall movable between a contracted condition for mounting the duct in a conduit and an extended condition of increased cross-sectional area for inserting a cable in the duct. The duct is moved to its extended condition by an applied internal pressure and, after the cable has been inserted, the duct is returned to its contracted condition. The duct has a multiple layer construction: an inner layer, an outer protective layer and a reinforcing layer between them. There may be frictional reducing ribs on the inner and/or outer layer in order to reduce the forces necessary to place the duct and/or the cable.

26 Claims, 4 Drawing Sheets

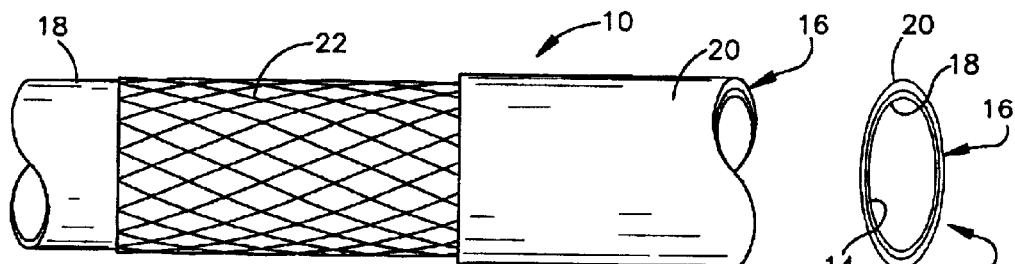
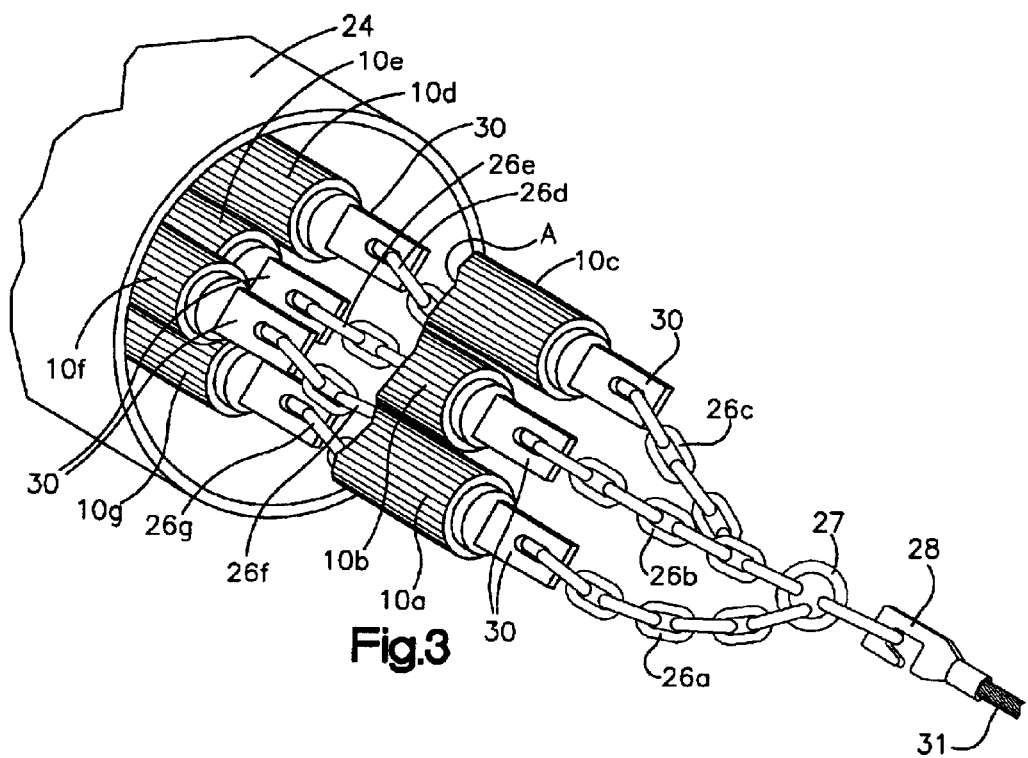

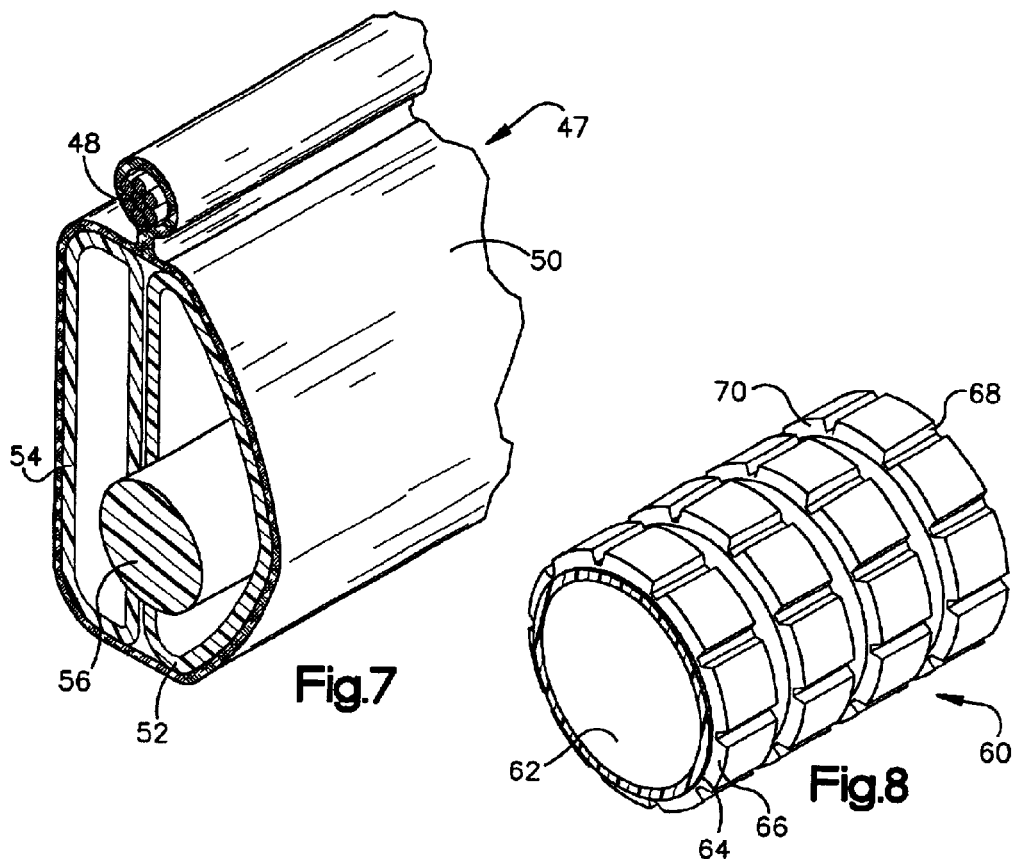
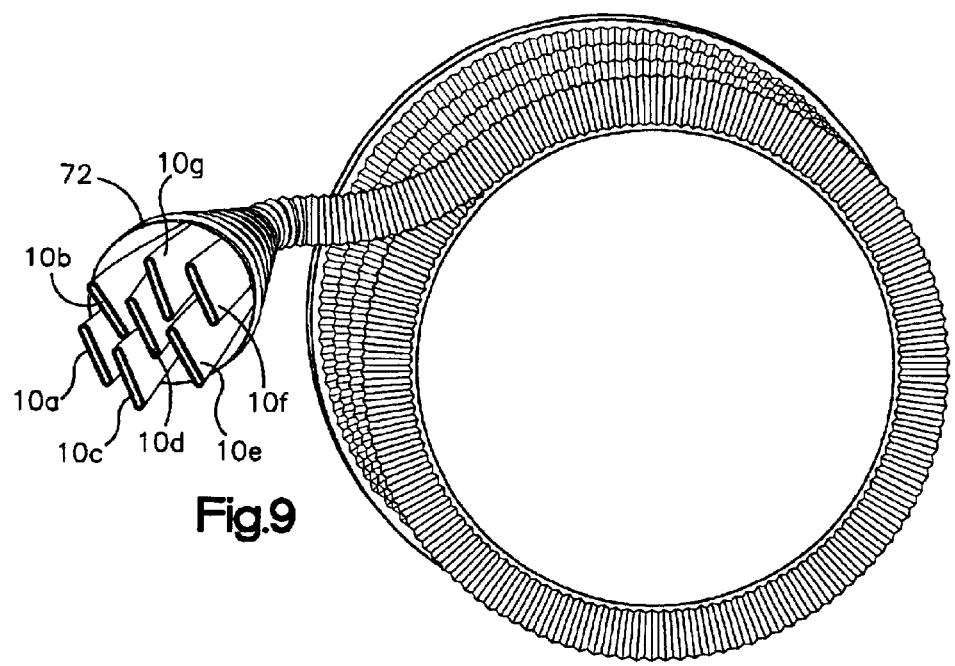

COLLAPSIBLE DUCT

BACKGROUND OF THE INVENTION

The present invention relates to ducts for containing cables, such as optical cables, and to methods for mounting such ducts in an enclosure or conduit.

In the telecommunications industry it is common practice to string cable through a duct, which has previously been placed in an outer conduit. The cable may be electrical, optical or any other type. In recent years, data transmission through optical cable has vastly expanded. As a result, there has been a great increase in demand for cable to carry the digital data. Existing conduits, both above and below ground, have been utilized for new ducts and cables. The old contents of the conduit, usually electrical cable, are removed and ducts are installed, through which optical cables are subsequently placed. U.S. Pat. Nos. 5,027,864 and 4,565,351, the contents of which are hereby incorporated by reference, are examples of this.

Existing conduits have a limited amount of interior space. Further, the conduits may extend along a tortuous path characterized by multiple bends and adjacent length portions extending in non-planar directions. They are usually circular in cross section and often are buried or otherwise not readily accessible. The ducts, which are placed in the conduits, usually have relatively rigid, circular cross-sections but are flexible along their length. Consequently, multiple ducts are difficult, if not impossible, to insert within conduits in some cases.

Using circular duct in a circular conduit is an inefficient utilization of space. That is, there is a considerable amount of wasted space between the circular ducts. For example, a conduit with a 4" internal diameter would hold only three ducts with a nominal 1¼" internal diameter. This inefficient use of the conduit interior space or cross-sectional area corresponds with a low packing efficiency.

In further efforts to achieve cable installation efficiencies, consideration has been given to the mounting or stringing of cable within existing utility service lines such as gas or water lines. Such an installation technique would provide a low-cost cable pathway to a home or business. However, such utility service lines are typically not oversized for the volume of water or gas that they are intended to deliver and may only range in diameter from one to several inches. Accordingly, even though the cable conduit may be small in diameter, it would still occupy a significant volume and cross-sectional area of the service line and tend to interfere with the utility delivery.

SUMMARY OF THE INVENTION

In accordance with the present invention, ducts having a variable cross-sectional configuration provide pathways for cables. The variable cross-sectional configuration of the duct facilitates mounting of the duct in an enclosure or conduit and also enables increased numbers of ducts to be mounted in a given size conduit. The cable may be inserted in the duct prior to or after the duct is mounted within the enclosure or conduit.

The cross-sectional configuration of the duct may be varied between an extended condition of greater cross-sectional area and a contracted condition of lesser cross-sectional area. Typically, the duct is normally in the contracted condition and is manipulated to the extended condition as by fluid pressure.

The facilitating of duct mounting in a conduit relates to the reduced cross-sectional area of the duct in the contracted condition and also to the reduced cross-sectional profile of the contracted duct as well as the increased duct flexibility or conformability provided by the collapsible duct wall. That is, the varied degrees of duct bending required as the duct is moved along a tortuous path are more readily accommodated by the variable cross-sectional configuration and collapsible wall of the duct.

This invention includes a method of installing a cable in an inner pathway or duct. The duct has a collapsible wall which is movable between an extended condition and a contracted condition. The extended condition has a greater cross sectional area than the contracted condition. The duct is inserted, in the contracted condition, into an outer conduit. The duct is moved to the extended condition and the cable is inserted into the duct. The duct is subsequently moved to the contracted condition. The duct may also be used without an outer conduit.

This invention further includes a duct providing a pathway for a cable. The duct includes a collapsible wall movable between an extended condition and a contracted condition wherein the extended condition has a greater cross-sectional area than the contracted position. When the duct is in the extended condition it is suitable to have a cable passed through it longitudinally. When the duct is in the contracted position it may be placed in a conduit in greater numbers than an equivalent size of a non-collapsible duct.

This invention greatly enhances the efficiency of existing conduits. In this invention the ducts are made of a collapsible or flexible material. While the ducts are sturdy enough to remain intact when cable is passed through them, the ducts have a normally contracted configuration of reduced cross-sectional area and, for example, they may collapse under their own weight. That is, the ducts flatten themselves unless there is a force to open them, such as air pressure. In this invention, the flattened ducts are pulled or pushed, in a flattened state, through a conduit. In a 4" internal diameter conduit there would be room for seven nominal 1¼" ID flattened ducts. This is over twice the number of rigid ducts of the same size.

When it is desired to place a cable in the duct, the duct is simply inflated. A source of air pressure, usually an air compressor, is connected to one end of the duct. The air pressure causes the duct to inflate to an expanded oval or circular cross section sufficiently large to permit a cable to pass through it. After the cable is inserted, that duct is deflated and another one is inflated. This process continues until all of the ducts have had a cable placed in them. The increase in capacity and efficiencies from this invention are obvious.

The size constraints that have heretofore inhibited the mounting of ducts in existing service lines or other pipelines are significantly lessened, if not overcome, by the collapsible ducts of the invention. That is, a greater number of cables may be contained in a smaller size duct and the cross-sectional area of the installed duct is itself reduced by collapsing the duct about the cables following installation. In this manner, a greater number of cables may be installed in a service line or pipeline with a minimal amount of flow reduction.

DESCRIPTION OF THE DRAWINGS

FIG. 1 is a side elevation, partly cut away, of the duct of this invention.

FIG. 2 is a front view of the duct of this invention.

FIG. 3 is perspective view of the collapsible ducts being pulled through a conduit with parts broken away for clarity of illustration.

FIG. 7 is a perspective view of an alternate embodiment of this invention, including a suspension member.

FIG. 8 is a perspective view of an alternate embodiment of this invention having longitudinal and circumferential grooves.

FIG. 9 is a perspective view illustrating collapsible duct in a coiled conduit.

DETAILED DESCRIPTION OF THE DRAWINGS

Figure 4:
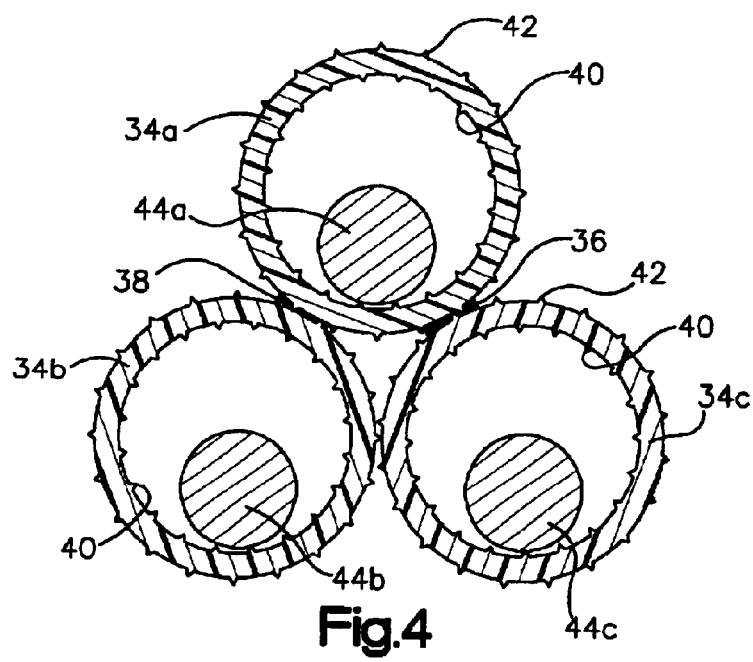
FIG. 4 is front elevation of three ducts joined along their lengths and having ribs.

As best seen in FIGS. 1–3, this invention includes a duct 10 or series of ducts 10a–10g. Each duct 10 forms a pathway 14. The duct 10 has a collapsible or flexible wall 16 which has three layers: an inner layer 18, an outer layer 20 and a reinforcement layer 22 between them.

The inner layer 18 is made of a low friction abrasion resistant material that is thin and flexible. materials that meet these criteria to one degree or another are polyolefins (polyethythylene, thermoplastic elastomers, polypropylene), polyester (polyethyleneterephthalate, polybutyleneterephthalate), polyamide (nylons), polyvinylchloride (PVC), polyvinylidene fluoride, polytetrufluoroethylene, acrylonitrile-butadiene-styrene, styrene-acrylonitrile, poly-sulfones and others known to one skilled in this art.

The outer layer 20 is made of a material that is durable and flexible. Known materials include flexibilized PVC's, urethane, thermoplastic elastomers, and silicone or vulcanized rubber compounds.

The reinforcement layer 22 must also be strong and flexible. Friction however, is not a concern. It may be made of a woven or non-woven material of organic, glass or metal fiber or bundles of same. Also, a slit-metal material of sufficient flexibility and resiliency may be used.

The reinforcement layer may be characterized by a bias ply or helical wrap arrangement to achieve the desired hoop strength and duct burst strength. The extrusion of the duct layers may provide longitudinal molecular orientation of the layer material and increased longitudinal tensile strength. However, longitudinal members may be used for added tensile strength. It should be understood that more or less layers may be used.

The duct 10 has a normally collapsed configuration of reduced cross-sectional area. The duct may be collapsible of its own weight. In the collapsed or contracted condition, the aspect ratio of the major duct dimension to the minor duct dimension (e.g. the major and minor axes of an ellipse or oval) may range from about 1.1:1 to about 25:1. Often, oval shape ratios range from about 5:1 to about 10:1.

The layers 18, 20 and 22 may be provided of the materials described herein and formed with various thicknesses selected in accordance with strength, wear and other design parameters while achieving the required flexibility or collapsibility to enable the duct to be operated between its extended and contracted conditions. The layer thickness may be varied to allow for variations in the stiffness of different construction materials. For example, layers formed of polyamides may be thinner than layers formed of polyolefins. Illustrative thicknesses for inner and outer layers formed of polyethylene may range from 0.01 to 0.2 inches. The thickness of the reinforcement layer 22 will typically be less than that of the outer layer and will range from about 0.02 to about 0.2 inches.

The duct 10 has a generally tubular shape, and the wall 16 is of a uniform construction and closed about the longitudinal axis of the duct. As described above, the construction of the wall 16 is collapsible about its entire periphery to provide increased applicability of the duct to various enclosures or conduits of restricted interior space. However, the wall 16 may include a noncollapsible portion joined to a collapsible portion to provide increased duct rigidity required in certain conduit applications characterized by less structural support.

As shown in FIG. 3, the ducts 10a–g may be pulled though a conduit 24 by chains 26a–g connected to associated ducts by plugs 30 mounted within the open end of each duct. A ring 27 connects the chains 26a–g to a hook 28 extending from a cable 31 which is often connected to a winch (not shown).

It should be appreciated that the ducts 10 are in their normally collapsed or contracted condition rearward of the plugs 30. For example, rearward of the breakline "A" extending through the lead group of ducts 10a, 10b and 10c, the downstream remaining portions of these ducts are in their normally collapsed configuration and pass alongside the expanded portions of the ducts 10d, 10e, 10f and 10g. The conduit 24 has a cross-sectional area sufficient to accommodate at least three collapsed ducts in juxtaposition with four extended ducts. The chains are different lengths in order to stagger the leading edges of the ducts 10a–g. Since the plugs 30 open the ducts to their full diameter, they may not all be pulled through the conduit 24 with the leading edges aligned and extending in the same plane. It is also possible to pull the ducts sequentially through the conduit in separate groups. The devices for pulling or pushing ducts are many, varied and well known in the art.

In the present invention, the ducts 10a–g are in a collapsed or contracted position rearward of the plugs 30 as they are drawn through the conduit 24. In the collapsed or contracted position, many more ducts can be installed in a conduit. For example, seven 1¼" collapsed ducts could be placed in a 4" ID conduit. Whereas, only 3 such ducts could be placed in a 4" conduit if the ducts had the full 1¼" circular cross-section.

In this invention, the duct 10 has an oval cross-section when it is in its normal or contracted condition as best seen in FIG. 2. It is in this contracted state when the ducts are placed in the conduit 24. After the ducts 10a–g are in place, they are expanded and cables are inserted into the ducts.

In order to move or operate the ducts to their extended state, air pressure is applied to one end of the duct. That is, air is forced into the entire length of one (or more) of the ducts to inflate or displace it to its extended condition. In its extended condition, a duct will have an expanded oval or circular cross-section. While in this condition, a cable is placed in the duct by either pushing or pulling it. After the cable is in place, the duct is returned to its contracted condition by stopping the air flow through it. This process is repeated on each of the ducts either one at a time or perhaps more until all of the ducts have a cable in them. This invention also contemplates other ways to expand the duct, such a liquid pressure, a low pressure on the outside of the duct and any other way to put the duct in its extended condition.

FIG. 4 illustrates an enhancement of the present invention. As shown in FIG. 4, the ducts 34a, 34b and 34c, if desired, may have internal ribs 40 and/or external ribs 42. The external ribs 42 have the purpose of reducing the frictional forces as the ducts 34a–c are placed in a conduit. The internal ribs 40 similarly reduce the frictional forces as cables 44a–44c are placed in the ducts 34a–34c. The ribs 40 and 42 have a spiral configuration. The spiral shape and function are described in greater detail in U.S. Pat. No. 5,087,153, incorporated earlier.

The ducts 34a–34c are shown in FIG. 4 in an extended position for illustration purposes. Normally, they would be in a contracted position. The ducts 34a–34c are secured together along their lengths at joints or connections 36 and 38. The connections may extend along the entire lengths of the ducts or be located at spaced intervals. The connections may be made during the molding process, but can be made in any way known in the art, such as heating, fusing, or adhesives. Also, the ducts 34a–34c can be tied together using plastic banding, for example. The connections 36 and 38 prevent or reduce the twisting of the ducts relative to each other as they are strung through a conduit.

Figure 5:
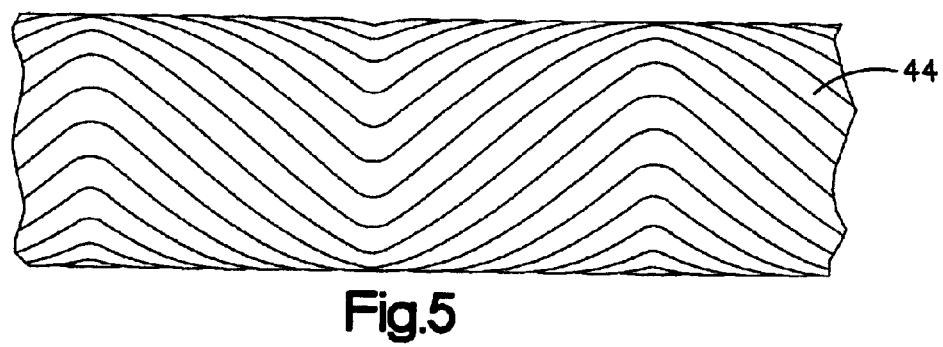
FIG. 5 is a side elevational view of the interior of one of the ducts of FIG. 4.
Figure 6:
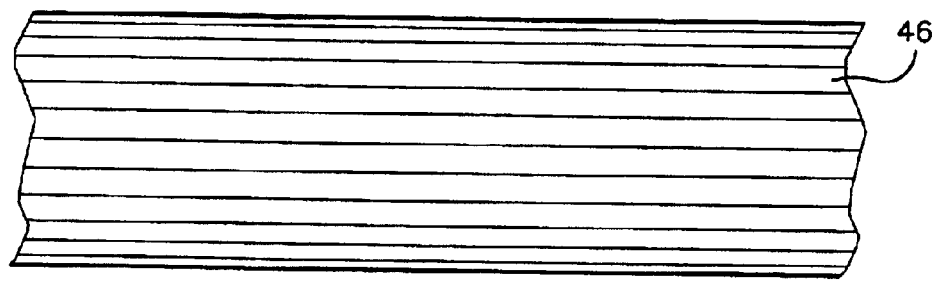
FIG. 6 is an elevational view similar to FIG. 5 of a duct in accordance with another embodiment.

FIG. 5 illustrates an oscillating arrangement of the internal ribs 40. That is, the ribs 40 extend along the interior surface of the duct 34 in a longitudinally directed repeating wave pattern, e.g., a sine wave pattern. In the wave pattern, the ribs extend in alternate circumferential directions as illustrated in FIG. 5. Straight or longitudinal ribs 46 are shown in FIG. 6. The benefits of these ribs are mentioned above and described further in U.S. Pat. No. 5,087,153, which is incorporated by reference.

Another embodiment of a suspended duct 47 is illustrated in FIG. 7 wherein a strand 48 supports a conduit 50 into which two ducts 52 and 54 have been placed. As described earlier, the ducts 52 and 54 are collapsible or flexible. The conduit 50 is also flexible. The ducts 52, 54 and conduit 50 may be formed of the materials described above.

In this embodiment, the conduit 50 is molded to enclose the strand 48. The ducts 52 and 54 may be molded with the conduit 50 or placed therein. The strand 48 is strong enough to support the entire structure between poles or other supports above the ground. A cable 56 is placed in the duct 52 in the same way as described above, that is, by inflating the duct 52 into an extended condition and then letting the duct 52 return its contracted position after the cable is placed therein.

FIG. 8 shows a corrugated duct 60 having an inner layer 62, a reinforcement layer 64 and an outer layer 66. The layers 62, 64 and 66 may be formed of the same materials as described above with respect to such layers. In this embodiment, the outer layer 66 has longitudinal grooves 68 and circumferential grooves 70 formed within the layer thickness.

The grooves 68 and 70 have a depth equal to about 25 to about 75% of the thickness of the layer 66, but other groove depths may be used. Increased groove depth provides greater duct flexibility.

The width of the grooves 68 and 70 is typically much less than the diameter of the duct and, often, may be an order of magnitude less than the diameter. For example, a duct having a 4" ID may have groove widths ranging from about 1/16" to about 5/8" or greater. Also, the grooves may not be of equal or uniform widths. Increasing groove widths will increase the duct flexibility.

The groove spacing or frequency may also be selected to achieve the desired degree of flexibility, with decreasing spacing yielding increasing flexibility. Typical spacing of longitudinal grooves may range from 30 to 60 degrees or more. Axial spacing of circumferential grooves may range from a fraction of the duct diameter to several times the diameter.

In all cases, it should be appreciated that the size, location and frequency of the grooves may be selected to optimize or fine tune the desired flexibility in a given material system. Similarly, it enables increased freedom of material selection and cost advantages since the corresponding restrictions in the resulting flexibility or collapsibility are reduced.

This grooved duct is particularly useful in applications requiring a high degree of duct flexibility in multiple planes or directions. Also, this duct construction is especially useful in mounting arrangements wherein it is attached to members that may expand and contract, causing the duct to do the same thing. Of course, the duct would have to expand and contract without breaking. One such application would be attached to a bridge.

It is possible to place collapsible ducts 10a–g in a conduit 72 during production as shown in FIG. 9. In this embodiment the conduit 72 is corrugated and encloses the ducts 10a–g, shown in their contracted condition. The conduit 72 could be produced and placed on a coil. At the installation site the enclosed ducts 10 would be simply laid with the conduit 72. The cables would be installed as described earlier.

The manufacture of the assembled conduit 72 and ducts 10 as shown in FIG. 9, enables the ducts to be introduced into the conduit under controlled manufacturing conditions. Accordingly, the installation in a tortuous job site configuration is facilitated, if not made possible, by the preassembly of the conduit and ducts.

Figure 10:
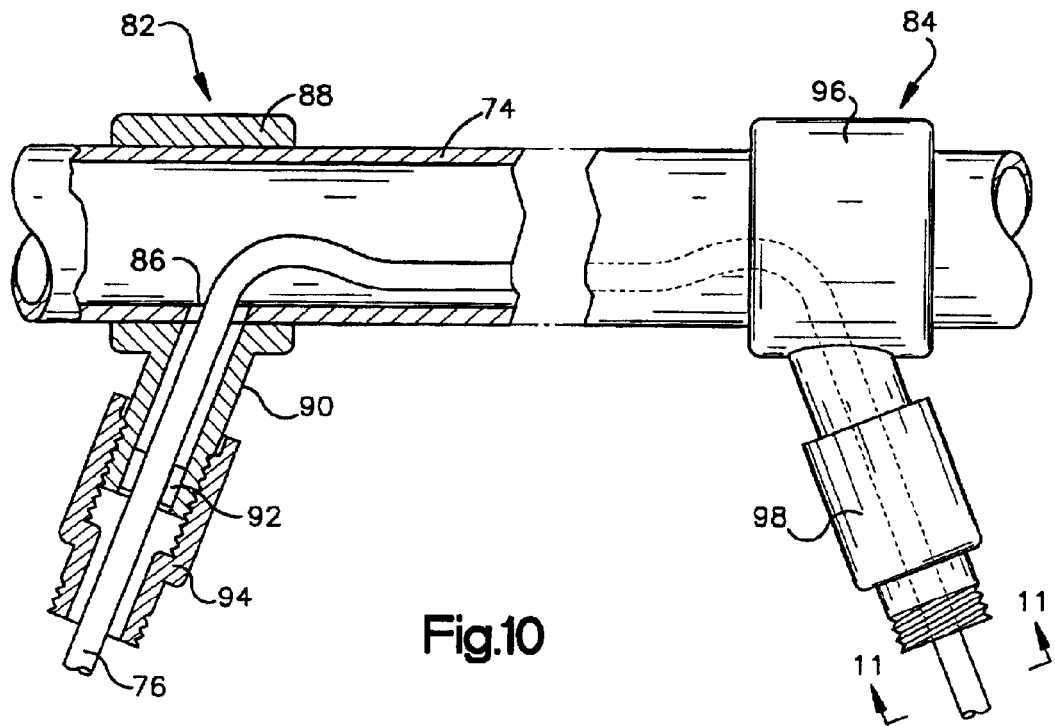
FIG. 10 is an elevational view, partly in section, showing another embodiment wherein a duct in accordance with the invention is mounted within a utility service line.
Figure 11:
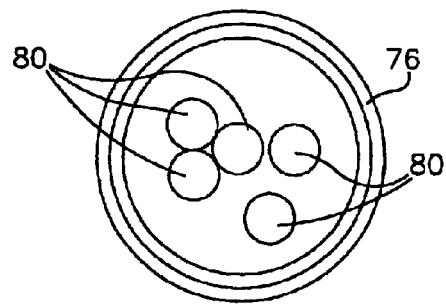
FIG. 11 is a sectional view, on an enlarged scale, taken along the line 11—11 in FIG. 10.

Referring to FIGS. 10 and 11, a service line 74 for providing a utility service such as natural gas or water is shown. The service line 74 is of conventional construction and may be a rigid or flexible pipeline formed of a suitable material, for example, plastic. As shown in FIG. 10, a duct 76 is mounted within a portion of the service line 74.

The duct 76 is similar to the ducts or conduits 24, 47, 60 and 72 described above. Accordingly, the duct 76 has a collapsible or flexible wall 78 of multilayer construction. At least the outermost layer of the wall 78 provides a fluid tight seal and is substantially inert to the water or gas utility being supplied in the line 74. In this manner, the gas or water is separated and isolated from cables 80 contained within the duct 76.

The duct 76 is introduced into the service line 74 at an entrance location 82 which may, for example, be near the utility street supply line. The duct 76 is withdrawn from the service line 74 at an exit location 84 just before the service line goes into the meter riser. In this manner, the service line 74 provides a low-cost pathway to the home or business.

At the entrance location 82, an opening 86 in the wall of the service line 74 communicates with a surface mount clamp 88 arranged to receive the duct 76 with a fluid tight seal. To that end, the clamp 88 includes a nozzle 90 through which the duct 76 passes as it is introduced into the service line 74. The nozzle 90 includes a ferrule seal 92 which may be sealed against the duct 76 by tightening a locking nut connector 94. The ferrule seal 92 encircles the duct 76 and is sufficiently compressed upon tightening of the connector 94 to form a continuous seal along the outer surface of the duct 76 when the latter is in the contracted condition.

At the exit location 84, an opening (not shown) similar to the opening 86 is provided in the wall of the service line 74 together with a second surface mount clamp 96 having a locking nut connector 98 operable to cause a second ferrule seal 92 (not shown) to engage the duct 76 with a fluid tight seal as the duct exits the service line 74.

In an illustrative example, the service line 74 comprises a one inch diameter plastic natural gas supply line to a residential home. The duct 76 has a polyurethane outer layer, a ⅜ inch outer diameter in the extended condition and contains a plurality of fiber-optic cables 80. With the gas service interrupted and the line 74 free of residual gas, the collapsed duct 76 is strung through the service line 74 using known techniques. The opposite ends of the duct 74 respectively extend from the clamps 88 and 96.

In the same manner as described above, the duct 76 is expanded and the cables 80 mounted therein. The duct 76 is then contracted in order to minimize the duct cross-sectional area and its effect on the service line 74. The opposite end portions of the duct 76 are then engaged in fluid tight seals by tightening the locking nut connectors 94 and 98. These seals close the service line, and the gas supply through the line 74 may be resumed.

Although particular embodiments of the invention have been described in detail, it is understood that the invention is not limited correspondingly in scope but includes all changes and modifications coming within the spirit and terms of the claims appended hereto.

What is claimed is:

1. A method of installing a cable in an inner pathway comprising the steps of:
   providing a duct with a collapsible wall to form said inner pathway, said collapsible wall being movable between an extended condition to provide the duct with a first cross-sectional area and a contracted condition to provide said duct with a second cross-sectional area smaller than said first cross-sectional area,
   inserting said duct with said collapsible wall in said contracted condition into said outer conduit,
   moving said collapsible wall to said extended condition to provide said duct with said first cross-sectional area,
   inserting said cable into said duct with said collapsible wall in said extended condition, and
   moving said collapsible wall to said contracted condition with said cable extending through said duct within said outer conduit.

2. A method as in claim 1, further providing said duct in a tubular shape and in a generally first oval or circular cross-section when said collapsible wall is in the extended condition and providing a flattened tubular shape and a generally second oval cross-section when said collapsible wall is in the contracted condition.

3. A method as in claim 1, wherein said duct is provided with a longitudinal axis and a closed duct wall extending about said axis, and said collapsible wall is provided with a major circumferential portion of said duct wall.

4. A method as in claim 3, wherein said collapsible wall forms substantially all of said closed duct wall.

5. A method as in claim 1, including the step of providing a plurality of said pathways respectively formed by a plurality of said ducts.

6. A method as in claim 5, which further includes securing said plurality of ducts together along their longitudinal lengths to form a duct assembly, and inserting said duct assembly with said collapsible walls in said contracted condition into an outer conduit.

7. The method as claimed in claim 1, including the step of pressurizing said duct before said cable is inserted and then depressuring said duct.

8. A method as in claim 2, wherein said duct is provided with said collapsible wall which is provided with a multiple layer construction including an outer protective layer, an inner liner layer for engaging said cable, a reinforcing layer extending between said outer layer and liner layer for increasing the hoop strength of said duct.

9. A method as in claim 8, which further includes providing said inner liner layer with a profiled surface to decrease frictional resistance as said cable is inserted in said duct.

10. A method as in claim 9, which further includes providing said profiled surface with one of longitudinal ribs, oscillating ribs or spiral ribs.

11. A method as in claim 8, which further includes providing said outer protective layer with longitudinal and circumferential grooves.

12. A method of installing a cable in an inner pathway extending within an outer conduit comprising the steps of
   providing duct means including collapsible wall means to form said inner pathway, said collapsible wall means being movable between an extended condition to provide said duct means with a first cross-sectional area and a contracted condition to provide said duct means with a second cross-sectional area smaller than said first cross-sectional area,
   inserting said duct means with said collapsible wall means in said contracted condition into said outer conduit,
   moving said collapsible wall means to said extended condition to provide said duct means with said first cross-sectional area,
   inserting said cable into said duct means with said collapsible wall means in said extended condition, and
   moving said collapsible wall means to said contracted condition with said cable extending through said duct means within said outer conduit.

13. A method as set forth in claim 12, which further includes providing said duct means with a plurality of ducts having tubular shapes and securing said ducts together along their longitudinal axes, and further providing said collapsible wall means including a plurality of collapsible walls, one of said collapsible walls being associated with each of said ducts.

14. A method as in claim 13, further providing at least one of said ducts in a tubular shape and a generally oval or circular cross-section when said collapsible wall is in the extended condition and providing a flattened tubular shape and a generally oval cross-section when said collapsible wall is in the contracted condition.

15. A method as in claim 13, further providing at least one duct has a longitudinal axis and a closed duct wall extending about said axis, and providing said collapsible wall forms a major circumferential portion of said duct wall.

16. A method as in claim 15, further providing said collapsible wall forms substantially all of said closed duct wall.

17. A method as in claim 13, further providing said collapsible wall with a multiple layer construction including an outer protective layer, an inner liner layer for engaging said cable, a reinforcing layer extending between said outer layer and liner layer for increasing the hoop strength of said duct.

18. A method as in claim 17, further providing said liner layer with a profiled surface to decrease frictional resistance as said cable is inserted in said duct.

19. A method as in claim 18, further providing said profiled surface with one of longitudinal ribs, oscillating ribs or spiral ribs.

20. A method as in claim 17, further providing said outer protective layer with longitudinal and circumferential grooves.

21. A method as in claim 13, wherein the step of inserting said duct means into said outer conduit includes one of pulling or pushing said ducts through said outer conduit in a staggered group or in a plurality of sequential groups.

22. A method as claim 12, further providing said outer conduit as a utility service line.

23. A method as in claim 22, further including the steps of providing an adjustable opening in said service line for receiving said duct means, adjusting said opening to a clearance position for receiving said duct means with sufficient clearance to insert said duct means into said service line and to insert said cable into said duct means when the duct means is in said extended condition, and, after said step of moving said collapsible wall means to said contracted condition, adjusting said adjustable opening to a sealing position for engaging said duct means in a fluid tight seal with said wall means in said contracted condition.

24. A method as in claim 23, further including the steps of providing said first mentioned adjustable opening in said service line at an entrance location for said duct means, providing a second adjustable opening in said service line at an exit location for said duct means, said second adjustable opening also being operable between clearance and sealing positions, extending said duct means and cable through said service line and said second adjustable opening in said clearance position, and adjusting said first and second openings to said sealing positions for engaging said duct means with said wall means in said contracted condition in fluid tight seals and thereby sealing said service line.

25. A method of installing a cable in an inner pathway extending within a utility service line comprising the steps of:

providing a duct including a collapsible wall to form said inner pathway, said collapsible wall being movable between an extended condition to provide said duct with a first cross-sectional area and a contracted condition to provide said duct with a second cross-sectional area smaller than said first cross-sectional area, providing an adjustable opening in said service line for receiving said duct, adjusting said opening to a clearance position for receiving said duct with sufficient clearance to insert said duct into said service line and to insert said cable into said duct when the duct is in said extended condition, mounting said duct in said service line by inserting said duct through said adjustable opening into said service line, moving said collapsible wall to said extended condition and inserting said cable into said duct, moving said collapsible wall to said contracted condition, and adjusting said opening to a sealing position for engaging said duct in a fluid tight seal with said wall in said contracted condition.

26. A method as in claim 25, further including the steps of providing said first mentioned adjustable opening in said service line at an entrance location for said duct, providing a second adjustable opening in said service line at an exit location for said duct, said second adjustable opening also being operable between clearance and sealing positions, extending said duct and cable through said service line and said second adjustable opening in said clearance position, and adjusting said first and second openings to said sealing positions for engaging said duct with said wall in said contracted condition in fluid tight seals and thereby sealing said service line.

* * * * *